United States Patent
Ishida et al.

(10) Patent No.: US 10,892,496 B2
(45) Date of Patent: Jan. 12, 2021

(54) CATALYST FOR SOLID POLYMER FUEL CELL AND PRODUCTION METHOD FOR THE SAME

(71) Applicant: Tanaka Kikinzoku Kogyo K.K., Tokyo (JP)

(72) Inventors: Minoru Ishida, Kanagawa (JP); Koichi Matsutani, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 560 days.

(21) Appl. No.: 15/323,286

(22) PCT Filed: Jul. 21, 2015

(86) PCT No.: PCT/JP2015/070678
§ 371 (c)(1),
(2) Date: Dec. 30, 2016

(87) PCT Pub. No.: WO2016/021399
PCT Pub. Date: Feb. 11, 2016

(65) Prior Publication Data
US 2017/0149069 A1   May 25, 2017

(30) Foreign Application Priority Data
Aug. 5, 2014 (JP) .................................. 2014-159156

(51) Int. Cl.
| H01M 4/92 | (2006.01) |
| H01M 4/86 | (2006.01) |
| H01M 8/1018 | (2016.01) |
| H01M 4/88 | (2006.01) |
| H01M 8/10 | (2016.01) |
| H01M 4/90 | (2006.01) |

(52) U.S. Cl.
CPC ............. *H01M 4/926* (2013.01); *H01M 4/86* (2013.01); *H01M 4/8663* (2013.01); *H01M 4/88* (2013.01); *H01M 4/90* (2013.01); *H01M 4/92* (2013.01); *H01M 8/10* (2013.01); *H01M 8/1018* (2013.01); *H01M 2004/8689* (2013.01); *H01M 2008/1095* (2013.01); *Y02P 70/50* (2015.11)

(58) Field of Classification Search
CPC .. H01M 4/926; H01M 4/8663; H01M 8/1018; H01M 2004/8689; H01M 2008/1095
See application file for complete search history.

(56) References Cited

U.S. PATENT DOCUMENTS

| 2004/0110060 A1* | 6/2004 | Yodoshi .............. H01M 4/8605 429/483 |
| 2006/0188768 A1 | 8/2006 | Kanaoka et al. |
| 2013/0035228 A1* | 2/2013 | Yamamoto .............. H01M 4/92 502/201 |

FOREIGN PATENT DOCUMENTS

| EP | 1263073 A1 | 12/2002 |
| JP | S6286668 A | 4/1987 |
| JP | H6-52871 | 2/1994 |
| JP | 2001-093531 A | 4/2001 |
| JP | 2007-209979 A | 8/2007 |
| JP | 2011-228268 A | 11/2011 |
| WO | WO 2002017428 A1 | 2/2002 |
| WO | WO 2014126077 A1 | 8/2014 |
| WO | WO 2015019953 A1 | 2/2015 |

OTHER PUBLICATIONS

Supplementary Search Report for European application No. 15829740.8, dated Nov. 30, 2017.

* cited by examiner

*Primary Examiner* — Osei K Amponsah
(74) *Attorney, Agent, or Firm* — Orrick, Herrington & Sutcliffe LLP; Joseph A. Calvaruso; K. Patrick Herman

(57) ABSTRACT

The present invention provides a catalyst for a solid polymer fuel cell, having excellent initial activity and good durability and a production method thereof. The present invention is a catalyst for a solid polymer fuel cell, including catalyst particles composed of platinum or a platinum alloy supported on a carbon powder carrier, the catalyst having sulfo groups ($-SO_3H$) at least on the catalyst particles, and the catalyst further having a fluorine compound having a C—F bond supported at least on the catalyst particles. It is preferred in the catalyst of the present invention that sulfur content is 800 ppm or more and 5000 ppm or less based on the mass of the whole catalyst and the amount of the fluorine compound is 3 mass % or more and 24 mass % or less based on the mass of the whole catalyst.

8 Claims, No Drawings

CATALYST FOR SOLID POLYMER FUEL CELL AND PRODUCTION METHOD FOR THE SAME

TECHNICAL FIELD

The present invention relates to a catalyst for a solid polymer fuel cell. Particularly, it relates to a catalyst useful for use in a cathode (air electrode) of a solid polymer fuel cell.

BACKGROUND ART

Fuel cells are greatly desired as a power generation system of next generation, and above all, a solid polymer fuel cell has the merits that an operating temperature is low and the cell is compact, as compared with fuel cells of other types. From those merits, the solid polymer fuel cell is considered promising as automotive power supply or household power supply. The solid polymer fuel cell has a laminate structure including a hydrogen electrode (anode), an air electrode (cathode) and a solid polymer electrolyte membrane sandwiched between the electrodes. A fuel containing hydrogen is supplied to the hydrogen electrode, and oxygen or air is supplied to the air electrode. Electric power is extracted by oxidation and reduction reactions occurred in each electrode. Furthermore, a mixture of a catalyst for accelerating an electrochemical reaction and a solid electrolyte is generally used in both electrodes.

A platinum catalyst having a precious metal, particularly platinum, as a catalyst metal supported thereon is conventionally used widely as a catalyst constituting the electrodes described above. Platinum as a catalyst metal has high activity in accelerating an electrode reaction in both a hydrogen electrode and an air electrode (Patent Document 1). Furthermore, a platinum alloy catalyst based on the platinum catalyst is known.

However, for the practical use of a fuel cell, further improvement in characteristics is required to a fuel cell catalyst with a platinum catalyst centered. For example, the direction of improvement of a fuel cell catalyst is the improvement of initial activity. The initial activity of a catalyst is the characteristic determining the performance of a fuel cell electrode, and its improvement is the top priority. Furthermore, the improvement of durability is required together with initial activity. A catalyst decreases its activity due to environmental change associated with operation of a fuel cell. In the case where its decreasing rate is large, it is difficult to say that the catalyst is a useful catalyst, no matter how high an initial activity is. It is difficult to completely avoid the decrease of activity, but it is necessary to suppress it as much as possible.

RELATED ART DOCUMENTS

Patent Document

Patent Document 1: JPH06-52871 A

SUMMARY OF THE INVENTION

Problems to be Solved by the Invention

In the conventional development of a fuel cell catalyst, the improvement of initial activity and the improvement of durability were mainly taken as separate problems. A principle relating to the respective problems and a theory for solving the problem differ, and the respective measures are not an incorrect approach. However, if activity and durability can be simultaneously improved, it will be the best measure. In view of the above, the present invention has an object to provide a catalyst excellent in both initial activity and durability as a catalyst for a solid polymer fuel cell, and a production method of the same.

Means for Solving the Problems

The present invention that solves the above problems is a catalyst for a solid polymer fuel cell, including catalyst particles composed of platinum or a platinum alloy supported on a carbon powder carrier, the catalyst having sulfo groups ($-SO_3H$) at least on the catalyst particles, and the catalyst further having a fluorine compound having a C—F bond supported at least on the catalyst particles.

The fuel cell catalyst according to the present invention is that sulfo groups ($-SO_3H$) are given to a catalyst (platinum catalyst or a platinum alloy catalyst) composed of platinum or a platinum alloy as a catalyst metal supported on a carbon powder carrier and a water repellent layer having a C—F bond of a fluorine compound is formed on the catalyst. According to the present inventors, those two functional constitutions added in the present invention affect catalyst characteristics by the respective individual mechanisms, but those synergistically improve catalyst characteristics. Each constitution is described below.

The introduction of sulfo groups to a fuel cell catalyst is to give proton conductivity to the catalyst to thereby improve activity (initial activity) of the catalyst. As is understood by considering a reaction ($O_2+4H^++4e^-\rightarrow 2H_2O$) in an air electrode of a fuel cell, the improvement of proton conductivity contributes to acceleration of a reaction in an air electrode. In the present invention, sulfo groups are added to catalyst particles, thereby efficiently supplying protons and improving initial activity.

The amount of the sulfo groups contained in the catalyst can be defined by the content of sulfur (S) element. It is preferred in the present invention that the sulfur content is 800 ppm or more and 5000 ppm or less based on the mass of the whole catalyst. When the sulfur content is less than 800 ppm, the effect of activity improvement is not achieved, and when it exceeds 5000 ppm, electron conduction of the catalyst deteriorates, thereby catalyst performance also deteriorates. The sulfur content is more preferably 1000 ppm or more and 4500 ppm or less, and still more preferably 1500 ppm or more and 4500 ppm or less, based on the mass of the catalyst.

According to the investigations by the present inventors, in the case of introducing a functional group (sulfo group) to the existing catalyst as in the present invention, catalyst activity may differ by controlling its arrangement state. The electrode reaction described above proceeds in a portion at which three phases of a reaction gas (oxygen), electron conductive material (catalyst particles) and a solid electrolyte are close to each other. Therefore, it is considered that a group that particularly acts effectively is sulfo groups arranged in the vicinity of catalyst particles.

As a result of investigation of preferred conditions regarding the arrangement state of the sulfo groups, the present inventors have found the suitable catalyst constitution in which sulfo groups are present on at least catalyst particles and in EDX analysis (energy dispersive X-ray analysis), a ratio ($I_S/I_{Pt}$) of a sulfur peak intensity ($I_S$) to a platinum peak intensity ($I_{Pt}$) on catalyst particles is within a range of 0.0044 or more and 0.0090 or less.

The above suitable conditions define the amount of sulfa groups arranged on the catalyst particles, based on sulfur peak intensity by EDX analysis. In other words, out of the sulfo groups introduced in the catalyst, the amount of sulfo groups arranged on the catalyst particles is defined. The catalyst of the present invention can improve initial performance while reducing the amount of a solid electrolyte added, when used in a solid polymer fuel cell.

When employing sulfur peak intensity ($I_S$) of EDX analysis as a base, the present invention employs a ratio ($I_S/I_{Pt}$) of the sulfur peak intensity ($I_S$) to the platinum peak intensity ($I_{Pt}$) as a base of evaluation. The reason far this is to eliminate analytical error derived from sensitivity of individual analyzers, contained in the value of sulfur peak intensity detected by EDX analysis. This is based on a thought that analytical error derived from an equipment does not change in the measurement of the same sample in EDX analysis.

When the intensity ratio ($I_S/I_{Pt}$) of peaks is 0.0044 or more and 0.0090 or less, initial performance particularly becomes good. Thus, as far as the improvement of initial performance is concerned, the suitable amount of sulfo groups introduced has the upper limit. This is considered that excessive sulfo groups may hinder electron conduction by catalyst particles.

In the present invention, elemental analysis was conducted based on energy intensity of characteristic X-ray by detecting the characteristic X-ray by EDX analysis. Specifically, the sulfur peak intensity ($I_S$) was measured on the basis of energy intensity of Kα line in the vicinity of 2.307 keV and the platinum peak intensity ($I_{Pt}$) was measured on the basis of energy intensity of Mα line of 2.0485 keV. The Kα line is characteristic X-ray generated when electron changed from L orbit to K orbit in an electron orbit of sample constituent atom, and the Mα line is characteristic X-ray generated when electron changed from N orbit to M orbit in the electron orbit. As a result of actual EDX analysis by the present inventors, superimposed portion derived from Pt spectrum that is a catalyst metal was contained in the sulfur peak intensity measured above. Therefore, the sulfur peak intensity was calculated by subtracting wave shape of standard spectrum of Pt separately measured, from the measurement value of energy intensity in the vicinity of 2.307 keV.

In addition to the introduction of sulfo groups described above, the present invention has the essential constitution that a water repellent layer is formed by a fluorine compound. The water repellent layer has the purpose of securing durability of a catalyst, and is used to suppress a decrease of activity with time.

Regarding the problem of durability improvement, some factors with the coarsening of catalyst particles as the top are considered as a factor of the decrease of catalyst activity with time. Of those factors, the present inventors have focused on deterioration by elution of a metal (platinum and metal added for constituting a platinum alloy) constituting catalyst particles. The deterioration mechanism is disappearance by electrochemical dissolution of each metal with the presence of water formed in a fuel cell reaction ($O_2+4H^++4e^- \rightarrow 2H_2O$) at a cathode side. As described above, the catalyst at a cathode side is exposed to atmospheres of high temperature, acidic atmosphere, high potential load and the like, and when water is present therein, dissolution and elution of a metal are accelerated.

In view of the above, it is the present invention that a water repellent layer containing a fluorine compound having a C—F bond has been formed on the surface of catalyst particles. It is known that a fluorine compound having high bonding power called a C—F bond has high stability and has unique properties such as water repellency. In the present invention, a water repellent layer containing the fluorine compound is formed on a catalyst, water generated is promptly discharged from the surface of catalyst particles, and dissolution of a catalyst metal with the presence of water is suppressed, thereby deterioration of activity is prevented.

Examples of the fluorine compound constituting the water repellent layer include a fluorine resin and a fluorine-based surfactant that are a water repellent polymer material. Specific examples thereof include polytetrafluoroethylene (PTFE) known as Teflon (registered trademark), tetrafluoroethylene.perfluoro-alkylvinyl ether copolymer (PFA), tetrafluoroethylene.hexafluoropropylene copolymer (FEP), tetrafluoroethylene.ethylene copolymer (ETFE), polyvinylidene fluoride (PVDF), polychlorotrifluoroethylene (PCTFE), perfluorosulfonic acid-based polymer known as Nafion (registered trademark) and perfluoroacrylic acid ester known as fluorinated acrylate. Furthermore, perfluorobutanesulfonic acid group (PFBS)-based surfactant is also effective as a fluorine-based surfactant.

In the present invention, a supported amount of the fluorine compound forming a water repellent layer is preferably 3 mass % or more and 24 mass % or less based on the mass of the whole catalyst. When the amount is less than 3 mass %, the it is not effective, and when the amount exceeds 24 mass %, the original function of a catalyst called electrode reaction acceleration cannot be exhibited. The amount is more preferably 5 mass % or more and 20 mass % or less.

The water repellent layer is not required to be formed on the whole surface of the catalyst particles, and may be partially formed thereon. Furthermore, the water repellent layer may be formed on only the catalyst particles, but even though a fluorine compound is supported on a carrier, it does not give influence to catalyst activity.

The catalyst having introduced therein sulfo groups and a fluorine compound according to the present invention as described above is not limited in terms of other constitutions. The constitution of a catalyst that was not referred in the above is described. Catalyst particles are composed of platinum or a platinum alloy. It is considered that the sulfonation and the formation of the water repellent layer in the present invention are effective to catalyst particles composed of platinum and catalyst particles composed of a platinum alloy.

Applying a platinum alloy obtained by alloying other metal and platinum as catalyst particles is useful from the standpoint of reducing the amount of platinum used. Furthermore, some catalyst particles composed of a platinum alloy have excellent characteristics such as initial activity. For example, an alloy of platinum and cobalt (PtCo alloy) is useful as a platinum alloy catalyst for fuel cell. Furthermore, in addition to the above, it is preferred in the present invention to use an alloy catalyst of platinum, cobalt and manganese (PtCoMn catalyst, preferably PtCoMn catalyst having a constitution that molar ratios based on Pt (molar ratio when mol number of Pt is 1) are Co/Pt=0.06 or more and 0.39 or less, and Mn/Pt=0.04 or more and 0.33 or less) as a useful platinum alloy catalyst for a fuel cell. Furthermore, platinum alloy catalysts such as an alloy catalyst of platinum, cobalt and magnesium (PtCoMg catalyst, preferably PtCoMg catalyst having a constitution that molar ratios based on Pt (molar ratio when mol number of Pt is 1) are Co/Pt=0.4 or more and 0.5 or less, and Mg/Pt=0.00070 or more and 0.00095 or less) and an alloy catalyst of platinum and manganese (PtMg catalyst, preferably PtMg catalyst having a constitution that a molar ratio based on Pt (molar ratio when mol number of Pt is 1) is Mg/Pt=0.005 or more and 0.06 or less) are also useful.

The catalyst particles composed of platinum or a platinum alloy preferably have an average particle diameter of 2 nm or more and 20 nm or less. When the average particle diameter is less than 2 nm, activity-sustaining property over a long period of time is not clearly obtained, and when it exceeds 20 nm, initial activity of a catalyst is not sufficiently obtained. The carbon powder used as a carrier preferably has a specific surface area of 250 $m^2/g$ or more and 1200 $m^2/g$ or less. When the specific surface area is 250 m²/g or more, an area on which a catalyst deposits can be increased. As a result, the catalyst particles can be highly dispersed, thereby increasing an effective surface area. On the other hand, when the specific surface area exceeds 1200 m²/g, the existence proportion of ultrafine holes (less than about 20 angstroms) in which an ion-exchange resin is difficult to enter in forming an electrode is increased, and utilization efficiency of the catalyst particles is deteriorated.

The catalyst according to the present invention preferably has a supporting density of the catalyst particles of 30% or more and 70% or less, considering the performance as an electrode of a solid polymer fuel cell. The supporting density used herein means a ratio of the mass of catalyst particles to be supported on a carrier (total mass of platinum and alloy element supported) to the mass of the whole catalyst.

A production method of the catalyst for a solid polymer fuel cell according to the present invention is described below. In producing the catalyst according to the present invention, a treatment for giving sulfo groups to a platinum catalyst or a platinum alloy catalyst and a treatment for forming a water repellent layer by a fluorine compound are conducted. The catalyst according to the present invention is produced by preparing a platinum catalyst or a platinum alloy catalyst and then conducting the following two treatments.

The catalyst is brought into contact with a mixed solution containing concentrated sulfuric acid and fuming sulfuric acid to introduce sulfa groups into the catalyst. A chemical solution used in sulfonation contains both concentrated sulfuric acid and fuming sulfuric acid as described above. According to the present inventors, sulfa groups can be given on the catalyst particles in a preferred state by using such a chemical solution. The concentrated sulfuric acid is sulfuric acid having a purity of 90 wt % or more, and the purity is preferably 95% or more, and more preferably 96% or more. The fuming sulfuric acid preferably has $SO_3$ content of 15 vol % or more and 30 vol % or less. A mixing ratio between concentrated sulfuric acid and fuming sulfuric acid is preferably 0.7 or more and 4.0 or less, and more preferably 1.0 or more and 2.0 or less, in a volume ratio (volume of concentrated sulfuric acid/volume of fuming sulfuric acid). The amount of the chemical solution is preferably 10 ml or more and 20 ml or less per 1 g of a catalyst.

The temperature of the mixed solution for the sulfonation treatment is preferably 30° C. or higher and 110° C. or lower. The temperature is more preferably 40° C. or higher and 90° C. or lower. The higher the solution temperature is, the larger the amount of sulfa groups introduced can be increased. However, the catalyst should have high initial performance when used in a fuel cell, and it does not mean that the more the amount of sulfo groups introduced, the better. For this reason, the solution temperature in the sulfonation has its upper limit in the production method of the present invention. When the temperature is lower than 30° C., sulfo groups are difficult to be sufficiently introduced, and when the temperature exceeds 110° C., the catalyst is difficult to become a catalyst having high initial performance in the case of using the sulfonated catalyst in a fuel cell.

The treatment time for sulfonation is preferably 8 hours or more and 24 hours or less. When the treatment time is shorter than 8 hours, sulfo groups are difficult to be sufficiently introduced. Even though the treatment is conducted for a long time in excess of 24 hours, the amount of sulfo groups introduced is not almost increased, and initial performance in the case of being used in a fuel cell is hardly improved.

In the production of the catalyst according to the present invention, a treatment for forming a water repellent layer on the surface of the catalyst particles is subsequently conducted. This treatment is to immerse a catalyst in a fluorine compound solution, and vaporizing or evaporating the fluorine compound solution to remove a solvent thereof, thereby having the fluorine compound supported on the catalyst. The fluorine compound solution used herein is a solution obtained by dissolving the fluorine compound in a solvent (diluent) that can dissolve the fluorine compound, and the solvent may be a fluorine-based solvent and may be a non-fluorine-based solvent. In this case, the amounts of the solvent and fluorine compound are adjusted such that the fluorine content of the fluorine compound solution is equal to the amount of fluorine to be supported on the catalyst.

In the immersion treatment for supporting the fluorine compound, it is preferred that the immersion time is 1 hour or more and 48 hours or less, and that the treatment is conducted while the solution is stirred. The temperature of the fluorine compound solution is 30° C. or higher and 150° C. or lower, but is selected depending on the kind of a solvent. After diping, the fluorine compound solution in which a catalyst is dispersed is heated with a drier or the like, and is maintained until all of a solvent disappears.

The order of the sulfonation treatment and the water repellent layer formation treatment is not particularly limited. Therefore, the catalyst may be first sulfonated and thereafter, the water repellent layer may be formed. Furthermore, sulfonation may be conducted after the formation of the water repellent layer In preparing a platinum catalyst or a platinum alloy catalyst to be treated, regarding the preparation of the platinum catalyst, a platinum catalyst produced by the conventional production method of a platinum catalyst is sufficient. Furthermore, the commercially available platinum catalyst may be used. The platinum catalyst is generally produced by bringing a platinum salt solution into contact (immersion, dropping) with a carrier, and then performing a reduction treatment to form platinum particles.

On the other hand, regarding the production of the platinum alloy catalyst, the basic steps correspond to the production process of a general alloy catalyst. A metal (platinum and a metal to be alloyed) constituting catalyst particles is supported on a carrier, appropriately dried, and a heat treatment is then conducted to perform alloying of a metal supported. Metals constituting catalyst particles may be simultaneously supported. Furthermore, each metal may be separately supported. In this case, a platinum catalyst on which only platinum has been supported is produced or prepared, addive metals (cobalt, manganese, magnesium and the like) to be alloyed are supported thereon, and each metal is alloyed, thereby a platinum alloy catalyst can be obtained. The alloying treatment in producing the platinum alloy catalyst is preferably that the catalyst in the state that each metal is supported thereon is heat-treated at 700° C. or higher and 1100° C. or lower. It is preferred to conduct the heat treatment in a non-oxidizing atmosphere, and particularly it is preferred to conduct in a reducing atmosphere (hydrogen gas atmosphere or the like).

Advantageous Effects of the Invention

As described above, the catalyst for a solid polymer fuel cell according to the present invention is excellent in both initial activity and durability. This effect is exhibited by the predetermined sulfonation treatment and formation treatment of a water repellent layer by a fluorine compound, and particularly excellent characteristics are exhibited by the synergistic effect of those actions.

MODE FOR CARRYING OUT THE INVENTION

First Embodiment

Preferred embodiments of the present invention are described below. In the present embodiment, sulfonation treatment and water repellent layer formation treatment were conducted to a platinum-cobalt catalyst (PtCo catalyst). The catalyst used is a commercially available PtCo catalyst (TEC36F52HT2, manufactured by Tanaka Kinzoku Kogyo K.K.). The PtCo catalyst has a platinum alloy (PtCo alloy) in which Co/Pt=0.455 (1/2.2) in a molar ratio is supported as catalyst particles, and an average particle diameter of the catalyst particles is 4.2 nm. A carrier is a carbon powder having a specific surface area of 800 m$^2$/g. The following sulfonation treatment and water repellent layer formation treatment were conducted to the PtCo catalyst.

Sulfonation of Catalyst

The catalyst (10 g) was immersed in 30 ml of concentrated sulfuric acid having a purity of 96% and 20 ml of fuming sulfuric acid having SO$_3$ content of 25 vol %, stirred at a liquid temperature of 40° C. for 8 hours, and thereby sulfonated. After the sulfonation treatment, a cleaning step of filtering, immersing in 3 L of ion-exchanged water of 70° C., stirring for 30 minutes and again filtering was conducted to remove unreacted sulfuric acid and fuming sulfuric acid. This cleaning step was conducted twice until cleaning water becomes neutral. After cleaning, it was dried overnight in air of 60° C., and then pulverized with a mortar. Thus, a sulfonated catalyst was obtained.

Formation of Water Repellent Layer on Catalyst

A fluorine compound solution was prepared by dissolving 40 mL of a commercially available fluorine resin material (trade name: EGC-1700, manufactured by Sumitomo 3M Limited, fluorine resin content: 1% to 3%) in 40 mL of hydrofluoroether (trade name: HFE-7100, manufactured by Sumitomo 3M Limited) as a solvent. A catalyst (10 g) was immersed in the fluorine compound solution, and stirred at 60° C. for 5 hours. Thereafter, the solution was retained in a drier at 60° C., and evaporated until a solvent is completely removed. Water repellent layer formation treatment was conducted on the catalyst by this treatment.

In the present embodiment, PtCo catalyst having been subjected to both the sulfonation treatment and the water repellent layer formation treatment (Example 1), PtCo catalyst having been subjected to only the sulfonation treatment (Comparative Example 1) and PtCo catalyst that had not been subjected to those treatments (Conventional Example) were produced. Those catalysts were subjected to sulfur analysis and fluorine analysis. Initial activity and durability of each catalyst were evaluated.

Sulfur Analysis

The amount (ppm) of sulfur in a catalyst was measured with an automatic halogen.sulfur analysis system (SQ-10 electric furnace and HSU-35 type absorption unit, manufactured by Yanaco Kikikaihatsu Laboratory Co.) and ion chromatography (manufactured by DKK-Toa Corporation). A catalyst (0.05 g) was heated from 450° C. to 750° C. in an electric furnace under the atmospheric pressure while passing through air in a flow rate of 2.2 l/min, and maintained for 5 minutes. Thereafter, the catalyst was heated to 900° C., and maintained for 5 minutes. A combustion-decomposed gas containing a sulfur component (sulfur dioxide SO$_2$) generated in a combustion process was dissolved in hydrogen peroxide water and collected. Sulfur ions (SO$_4^{2-}$) were separated and quantified by ion chromatography, and a sulfur concentration (ppm) was calculated.

Fluorine Analysis

A catalyst was subjected to ICP analysis to perform elemental analysis, and a fluorine concentration was calculated based on the measurement value, while a mass ratio between each metal and a carbon carrier is taken into consideration.

Initial Activity Evaluation Test

The catalysts of the above Example and Comparative Example were subjected to an initial activity test of a fuel cell. This performance test was conducted by measuring Mass Activity. A single cell was used in the test, and a membrane/electrode assembly including a proton conductive polymer electrolyte membrane sandwiched between cathode and anode electrodes having an electrode area of 5 cm×5 cm=25 cm$^2$ (Membrane Electrode Assembly: MEA) was prepared and evaluated. As a pretreatment, a current/voltage curve was prepared under the conditions of hydrogen flow rate: 1000 mL/min, cell temperature: 80° C., anode humidifying temperature: 90° C. and cathode humidifying temperature: 30° C. Thereafter, as a main measurement, Mass Activity was measured. In the test method, a current value (A) at 0.9 V was measured, a current value per 1 g of Pt (A/g-Pt) was obtained from the weight of Pt applied to an electrode, and Mass Activity was calculated.

Durability Evaluation Test

In the durability test, a cathode electrode (air electrode) was produced from a catalyst to constitute a fuel cell, an accelerated deterioration test in which cell potential of a cathode is swept by a triangle wave was conducted, and power generation characteristic after deterioration was measured. The accelerated deterioration was that the surface of catalyst particles was cleaned by sweeping in a sweep rate of 40 mV/s in a range of from 650 to 1050 mV for 20 hours, and thereafter sweeping was conducted in a sweep rate of 100 mV/s in a range of from 650 to 1050 mV for 20 hours, 4 hours, and 68 hours to deteriorate. Mass Activity of each catalyst after deterioration under each condition was measured.

Analytical results and evaluation test results of the catalysts of Example 1, Comparative Example 1, and Conventional Example are shown in Table 1.

TABLE 1

| | Sulfonation | Water repellent layer | S content (ppm) | Amount of F compound (wt %) | Initial activity*1 | Durability*1 After 20 hrs | After 44 hrs | After 68 hrs |
|---|---|---|---|---|---|---|---|---|
| Example 1 | Conducted | Present | 1862 | 13.15 | 1.50 | 1.50 | 1.00 | 0.97 |
| Comparative Example 1 | Conducted | None | 2054 | — | 1.36 | 0.88 | 0.75 | 0.55 |
| Conventional Example | None | None | — | — | 1.00 | 0.83 | 0.59 | 0.37 |

*1: Initial activity (Mass Activity) of Conventional Example is 1.0

It can be confirmed from Table 1 that the catalyst of Example 1 in which a platinum alloy catalyst was subjected to sulfonation and water repellent layer formation is excellent in both initial activity and durability. As compared with a catalyst in which only sulfonation was conducted as in Comparative Example 1, the improvement in initial activity was observed even in the catalyst of Comparative Example 1 as compared with Conventional Example. However, considering durability, activity was deteriorated even the elapse of time of about 20 hours, and the activity was half or less of the initial value after 68 hours. Sulfonation is effective to improve initial activity, but cannot almost contribute to durability, and it was conformed that synergistic improvement of catalyst characteristics was achieved by simultaneously conducting water repellent layer formation.

Second Embodiment

In the present embodiment, PtCo catalysts in which sulfonation conditions had been change were treated with a fluorine compound to produce a plurality of catalysts, and sulfur analysis and initial activity were evaluated. In the change of sulfonation conditions, a mixing ratio in a mixed solution containing concentrated sulfuric acid and fuming sulfuric acid and a temperature of the solution were changed.

TEM-EDX Analysis

In the present embodiment, TEM-EDX analysis of a catalyst was also conducted. Each catalyst was observed with TEM (transmission electron microscope, Cs-corrected STEM equipment, Model Number JEM-ARM200F, manufactured by JEOL) in a circular analytical region having a diameter of about 2 nm under the conditions of accelerated voltage: 80 kV and STEM beam diameter: less than 0.2 nm. Regarding optional 7 points on catalyst particles (Pt—Co), peak intensity was measured for a cumulative time of 60 seconds by SDD detector manufactured by JEOL and EDX (energy dispersive X-ray analysis) of Noran System 7 System Analyzer manufactured by Thermo Fisher Scientific Inc.

Out of the EDX data measured, sulfur peak intensity (the vicinity of 2.307 keV) was subjected to the following analyses (1) and (2) in order to remove the amount of superposition derived from Pt included in the measurement value.

(1) Seven points on catalyst particles of a catalyst that is not sulfonated were subjected to EDX analysis, and spectrum obtained was used as Pt standard spectrum. A catalyst in which an average particle diameter of catalyst particles is the same as that of a sulfonated catalyst was used in the measurement of the Pt standard spectrum.

(2) Seven points on catalyst particles of a catalyst that had been sulfonated were subjected to EDX analysis, and the difference in wave form between each spectrum obtained and the Pt standard spectrum of (1) was calculated every measurement point, and was used as sulfur peak intensity (S-Kα0 intensity).

Regarding the sulfur peak intensity (S-Kα intensity) calculated above and the platinum peak intensity (the vicinity of 2.0485 keV) actually measured by EDX, an average value of values at 7 measurement points was calculated ($I_S$ and $I_{Pt}$). Furthermore, a peak intensity ratio ($I_S/I_{Pt}$) was calculated as an average value of values of 7 points after calculating a peak intensity ratio in each measurement point.

The analytical results of the catalyst according to each example and the results of initial activity evaluation are shown in Table 2.

TABLE 2

| | Sulfonation condition | | | | |
| --- | --- | --- | --- | --- | --- |
| | Concentrated sulfuric acid: fuming sulfuric acid | Temperature | S content (ppm) | Peak intensity ratio ($I_s/I_{Pt}$) | Initial activity*[1] | Amount of F compound (wt %) |
| Example 1 | 1:1 | 40° C. | 1862 | 0.0056 | 1.50 | 13.15 |
| Example 2 | 1.5:1 | 90° C. | 904 | 0.0067 | 1.28 | 13.49 |
| Reference Example | 6:1 | 40° C. | 1949 | 0.0080 | 1.21 | 14.58 |
| Conventional Example | — | — | — | — | 1.00 | 0.00 |

*[1]Mass Activity of Conventional Example is 1.0

From Table 2, the improvement effect of initial activity by sulfonation treatment can be reconfirmed. This can be also confirmed from the results of EDX analysis, and Examples 1 and 2 in which a peak intensity ratio ($I_S/I_{Pt}$) is within a range of 0.0044 or more and 0.0090 or less show preferred activity.

Third Embodiment

Catalysts in which the amounts of a fluorine resin material (EGC-1700) as a water repellent and hydrofluoroether (HFE-7100) as a solvent had been variously changed were produced, and initial activity and durability evaluation tests were conducted. Catalysts were produced in the same manner as in Example 1, except that the proportion of the water repellent added was changed as shown in the table below. Furthermore, each performance evaluation was performed in the same contents as in the first embodiment.

TABLE 3

| | Water repellent | | S content | Amount of F compound | Initial activity[1] | Durability[1] | | |
|---|---|---|---|---|---|---|---|---|
| | EGC | HFC | (ppm) | (wt %) | | After 20 hrs | After 44 hrs | After 68 hrs |
| Example 1 | 20 mL | 20 mL | 1862 | 13.15 | 1.50 | 1.50 | 1.00 | 0.97 |
| Example 3 | 5 mL | 20 mL | 4187 | 23.30 | 0.00 | 0.00 | 0.00 | 0.00 |
| Conventional Example | — | — | — | — | 1.00 | 0.83 | 0.59 | 0.37 |

[1]Mass Activity of the conventional example is 1.0

INDUSTRIAL APPLICABILITY

The catalyst for a solid polymer fuel cell according to the present invention is well-balanced in terms of initial activity and durability and is excellent. A solid polymer fuel cell is desired as a power generation system of next generation in automotive power supply, household power supply and the like. Recently, sales start of fuel cell vehicle is becoming topical. The present invention contributes to a stream of a practical use of the fuel cell.

The invention claimed is:

1. A catalyst for a solid polymer fuel cell, comprising catalyst particles composed of platinum or a platinum alloy supported on a carbon powder carrier,
wherein the catalyst has sulfo functional groups (—$SO_3H$) that are directly bonded to the catalyst particles,
wherein the catalyst further has a fluorine compound having a C—F that is formed separately from the sulfo functional groups and directly bonded to the catalyst particles, and
wherein sulfur (S) content is 800 ppm or more and 5000 ppm or less based on the mass of the whole catalyst.

2. The catalyst for a solid polymer fuel cell according to claim 1, wherein an amount of the fluorine compound is 3 mass % or more and 24 mass % or less based on the mass of the whole catalyst.

3. The catalyst for a solid polymer fuel cell according to claim 1, wherein the fluorine compound is a fluorine resin or a fluorine-based surfactant.

4. The catalyst for a solid polymer fuel cell according to claim 1, wherein in EDX analysis, a ratio ($I_S/I_{Pt}$) of a sulfur peak intensity ($I_S$) to a platinum peak intensity ($I_{Pt}$) on the catalyst particles is within a range of 0.0044 or more and 0.0090 or less.

5. The catalyst for a solid polymer fuel cell according to claim 1, wherein the catalyst particles comprise any one of platinum, a platinum-cobalt alloy, a platinum-cobalt-manganese alloy, and a platinum-cobalt-magnesium alloy.

6. The catalyst for a solid polymer fuel cell according to claim 1, wherein a supporting density of the catalyst particles is 30% or more and 70% or less.

7. The catalyst for a solid polymer fuel cell according to claim 2, wherein the fluorine compound is a fluorine resin or a fluorine-based surfactant.

8. The catalyst for a solid polymer fuel cell according to claim 2, wherein in EDX analysis, a ratio ($I_S/I_{Pt}$) of a sulfur peak intensity ($I_S$) to a platinum peak intensity ($I_{Pt}$) on the catalyst particles is within a range of 0.0044 or more and 0.0090 or less.

* * * * *